United States Patent
Lee et al.

(10) Patent No.: US 6,212,638 B1
(45) Date of Patent: Apr. 3, 2001

(54) METHOD FOR GENERATING UNPREDICTABLE AUTHENTICATION IDENTIFICATION SYMBOLS

(76) Inventors: George C. Lee, 31 The Hamlet, E. Amherst, NY (US) 14051; Zhong Liang, 54 Rosewood Dr., Williamsville, NY (US) 14221

( * ) Notice: Subject to any disclaimer, the term of this patent is extended or adjusted under 35 U.S.C. 154(b) by 0 days.

(21) Appl. No.: 08/982,406

(22) Filed: Dec. 2, 1997

(51) Int. Cl.$^7$ .................................................. H04L 9/32
(52) U.S. Cl. ..................... 713/179; 708/250; 708/255; 380/51
(58) Field of Search ................. 380/1, 51; 235/375, 235/385; 708/250, 255; 382/103, 100; 705/22; 713/179

(56) References Cited

U.S. PATENT DOCUMENTS

| | | |
|---|---|---|
| 3,833,795 | 9/1974 | Shoshani et al. . |
| 4,463,250 | 7/1984 | McNeight et al. . |
| 4,629,873 | 12/1986 | Stockburger et al. . |
| 4,686,515 | 8/1987 | Anderson et al. . |
| 4,816,824 | 3/1989 | Katz et al. . |
| 5,367,148 * | 11/1994 | Storch et al. ........................ 235/375 |
| 5,418,855 | 5/1995 | Liang et al. . |
| 5,592,561 * | 1/1997 | Moore ................................ 382/103 |
| 5,974,150 * | 10/1999 | Kaish et al. ......................... 713/179 |

OTHER PUBLICATIONS

Menezes et al., Handbook of Applied Cryptography, 1997, p. 175.*

Schneier, Bruce, Applied Cryptography: Protocols, Algorithms, and Source Code in C, 10/95, pp. 44–45.*

Chen, L., et al., "Key Escrow in Mutually Mistrusting Domains," Proceedings of Security Protocols, Mark Lomas (ed.), International Workshop, Cambridge, U.K., pp. 139–153, (Apr. 10–12, 1996).

(List continued on next page.)

*Primary Examiner*—Gail O. Hayes
*Assistant Examiner*—Christopher M. Tucker
(74) *Attorney, Agent, or Firm*—Jones, Tullar & Cooper PC

(57) ABSTRACT

A method for generating authentication identification symbols, such as numbers, letters, etc., generates sequences of unpredictable symbols which are employed by vendors of various types of goods to authenticate the goods. Using special mathematical functions, an agent generates a first unpredictable subset of symbols to be supplied to a vendor for marking the vendor's goods. The subset is unpredictable in that knowledge of one or more symbols in the subset cannot be employed to predict other symbols in the subset. Preferably, the vendor then selects another subset of symbols from the first subset, and the symbols in this sub-subset are employed for marking the vendor's goods. The unpredictability of the symbol sequences prevents a counterfeiter from being able to predict other symbols in the sequence. In addition, the vendor's use of a sub-subset of symbols prevents the agent from knowing which of the original subset of symbols the vendor is employing to mark the goods. Checking procedures are also employed to permit authentication of the identification symbols by a customer, for example.

25 Claims, 4 Drawing Sheets

OTHER PUBLICATIONS

Salomaa, Arto "Public Key Cryptography," Chptr. 1, 2nd ed., Springer, (1996).

Schneier, Bruce "Applied Crytography, Protocols, Algorithms, and Source Code in C," Chptrs. 1,2,11,17,18, 2nd ed., John Wiley & Sons, Inc., (1996).

Simonds, Fred "Network Security, Data and Voice Communications," Chptrs. 10,12, McGraw–Hill, (1996).

Gustafson, H.M., et al., "Randomness Measures Related to Subject Occurence," Proceedings of Cryptography: Policy and Algorithms, Ed Dawson, and Jovan Golic (eds.), Brisbane, Queensland, Australia, pp. 132–143 (Jul. 3–5, 1995).

Bakhtiari, S., et al., "Keyed Hash Functions," Proceedings of Cryptography: Policy and Algorithms, Ed Dawson and Jovan Golic (eds.), Brisbane, Queensland, Australia, pp. 201–214 (Jul. 3–5, 1995).

Lee, S., et al., "Conditional Correlation Attack on Nonlinear Filter Generators," Proceedings of Advances in Cryptology—ASIACRYPT '96, Kwangjo Kim and Tsutomu Matsumoto (eds.), pp. 360–367 (Nov. 3–7, 1996).

* cited by examiner

METHOD FOR GENERATING UNPREDICTABLE AUTHENTICATION IDENTIFICATION SYMBOLS

BACKGROUND OF THE INVENTION

The present invention relates to a method for generating identification symbols, numbers or codes for authenticating goods or the like, which provides multiple levels of security among agents, vendors, sub-vendors and customers.

In many regions of the world, the widespread sale and distribution of counterfeit goods presents a tremendous problem to the manufacturer of the authentic goods. One known technique for preventing counterfeiting is to provide the authentic goods with identification numbers or marks which cannot be readily copied. For example, it is known to mark goods with randomly selected ID numbers which, because of their random selection, arguably cannot be predicted or anticipated by a counterfeiter. Unfortunately, it is well known in cryptography that randomly selected numbers are not truly random. Thus, without proper measures, it is possible for counterfeiters to determine the pattern of "random" generation, and thereby defeat the random marking system.

Even if the random ID numbers could not be predicted, other security problems can nevertheless enable counterfeiters to acquire this set of numbers. In particular, the manufacturer of the goods has knowledge of the randomly selected, valid ID numbers, and the list of ID numbers may also be provided to resellers of the goods so that they may confirm the authenticity of the goods. Under these circumstances, it is often not difficult for a counterfeiter to obtain the list of valid ID numbers in an illegitimate manner.

In view of the foregoing, a need therefore exists for an improved method for marking goods to prevent counterfeiting which employ numbers or codes that cannot be readily predicted nor detected by potential counterfeiters.

SUMMARY OF THE INVENTION

The present invention satisfies the foregoing need by providing a method for generating identification symbols, numbers or codes (IDs) for authentication of goods and other objects, in which special functions are employed to select the IDs which make them unpredictable. The term unpredictable means that knowledge of one or more of the IDs cannot be employed to predict or determine the identity of other valid IDs. In addition, multiple sets of the IDs are employed in such a manner that no one individual has complete knowledge of any particular set, thereby greatly improving security against illegitimate acquisition of the IDs.

In the method, one or more sets of multi digit symbols, such as numbers, letters, characters and/or their combinations, is/are generated by an agent using algorithms which select the symbols in such a manner that they are unpredictable. To generate the unpredictable set of symbols, the algorithms employ functions known as Nyquist functions which are derived from the Nyquist sampling theorem. In particular, the Nyquist sampling theorem states that a cyclic, e.g., sinusoidal, function for a deterministic curve cannot be identified if sampling points in the curve are taken less than two per cycle. Thus, if a selection function is employed to generate a set of symbols such that each symbol represents a point along a curve defined by a cyclic function, and less than two points are selected for each cycle of the curve, then the resulting set of symbols will be unpredictable.

To enhance unpredictability, certain subsets of the IDs are then selected by the agent from each original set, again by using special Nyquist functions, which create subsets that are also unpredictable. These subsets are delivered to the vendors or the manufacturers of the goods or products to be authenticated. The vendors or manufacturers protect their products by marking each of them with one or more of the symbols in the subsets. The selection functions employed by the agent for creating the subsets are controlled by secret keys known only by the agent. In this manner, the agent can generate different subsets of symbols for different vendors or manufacturers. To enhance security of the IDs, the vendors and manufacturers, using certain selection functions with their own secret keys, each select their own sub-subset of symbols which are used to mark the goods each vendor or manufacturer sells.

Using the foregoing technique, the subject method provides three-way attack resistance from counterfeiters. First, a customer who purchases the goods from a vendor can verify that the goods are genuine by checking whether the symbols on the goods are valid. This is preferably accomplished through comparison to symbols stored in an authorized database which may be accessed by any suitable means, such as a telephone or the Internet, for example. Since the symbols are generated using the special Nyquist functions as selection and check functions, it is impossible for a customer to determine the functions by which the symbols on the goods were generated. Thus, regardless of how the original sets of symbols generated by the agent were selected, the customer cannot determine the identity of the symbols within the sub-subset since they have no knowledge of the hash functions employed to form the sub-subset.

Similarly, the method is resistant to counterfeiting by individuals associated with either the agent or a vendor. In particular, an individual who is associated with the agent and has knowledge of both the original sets of symbols and the secret keys employed to generate the subsets of symbols, cannot determine the identity of the sub-subsets of symbols since only the vendor or manufacturer possesses knowledge of the secret key employed to form the sub-subsets. Conversely, a potential counterfeiter having access to the vendor's secret key cannot determine the identity of the sub-subsets without having knowledge of the subsets of symbols which were provided by the agent to the vendor.

As a further deterrent, whenever a customer communicates with the database to determine whether their set of symbols is valid, that set of symbols can then be marked as "used" so that if any attempt is made by a counterfeiter to use the same symbols on different goods, this will quickly be detected when the purchaser of the counterfeit goods checks the symbols against those stored in the database.

Preferably, multiple sets of symbols are employed for each ID to accelerate checking speed, and automatically invalidate used symbols. In particular, the size of one of the sets is considerably smaller than the other, and this smaller set is examined by comparing its value to the value stored in the database. Because of its smaller size, the first set of symbols can be quickly checked against those in the database to verify whether they have been used previously. If so, it can be concluded that both sets of symbols are invalid since at least one of the sets is invalid.

The present invention also employs a special fire wall technique for permitting customer access to the ID database to verify the authenticity of their ID symbols. In this technique, when a customer accesses the database, they are prompted to enter the ID symbols to be checked. Each ID symbol, when converted to digital form, has a preset number of bytes, and a digital counter is employed to count the total number of bytes entered by the customer. As soon as the number of bytes entered equals the total number of bytes in the ID, the system is triggered to switch off input from the customer so that the customer cannot enter any further data. The system then allows only a communication of one of two signals, "yes" or "no", indicating whether the entered set of symbols is valid or not. With this arrangement, there is no way for individuals to access the agent's main computer system in an effort to determine the original sets of symbols and the agent's secret keys.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENT

The present invention makes use of sets of symbols for authenticating goods, or the like, which are unpredictable so that a potential counterfeiter cannot, from knowledge of one or more legitimate symbols in the sets, determine the identity of other valid symbols in the sets. A key feature of the present invention is therefore the manner in which these unpredictable sets of symbols are selected. It should be stressed at the outset that just because a set of symbols or numbers is randomly selected, does not mean that the set is necessarily unpredictable. Rather, to be unpredictable, a set of symbols must satisfy certain criteria which have been discovered by the inventors. In particular, through the use of the known Nyquist sampling theorem, the inventors have developed functions for generating sets of unpredictable symbols or numbers which are referred to as Nyquist hash functions or Nyquist functions. A detailed discussion of the development of these functions follows.

A sequence of positive numbers, $R=[b_1, b_2, \ldots b_n]$, is said to be most likely random, if the sequence passes all of the statistical random tests. Generally, a number $b_i$ appears randomly in a sequence if both its value and the order $i$ of its appearance in the sequence are random. In addition, the distribution of possibility of the appearance of those numbers with different values can be another indicator of the randomness. In the case of having a very large set of available numbers, the order and the distribution can lose its importance in the sense of gaining unpredictability. Predictability of R then depends on 1) whether the exact value, not the order, of a specific number $b_i$ in R is predictable; and 2) whether the formula of the sequence is recoverable. Thus, just because the sequence is random does not mean that the sequence is also unpredictable.

Figure 1:
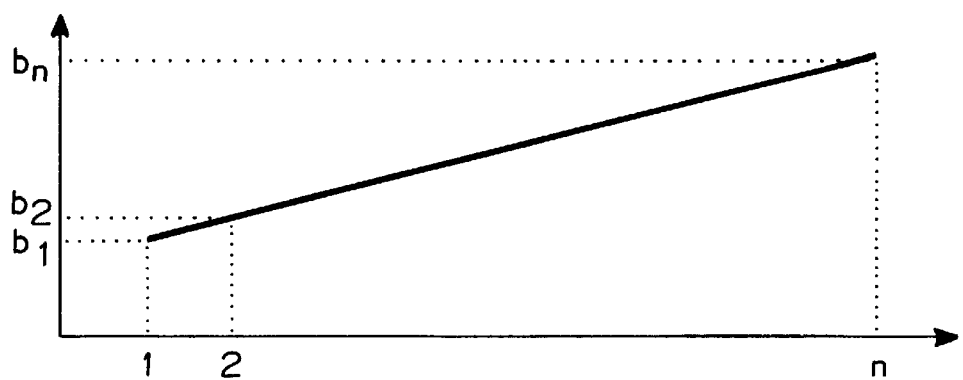
FIG. 1 is a graph of a linear curve representing a predictable, uniformly distributed random sequence of symbols.

The italic font is used to denote the $i^{th}$ number $b_i$ appearing in R without regard to the values of $b_i$. Now, assume that R is rearranged to form the sequence $R=[b_1, b_2, \ldots b_n]$, such that $b_1<b_2<\ldots b_n$. The reason for this arrangement is if an attacker (cryptanalyst) wants to guess certain numbers $b_i$ in the sequence, or recover the sequence generator, he may not need to be concerned with the appearance order $i$ of the numbers in the sequence. Take the uniformly distributed sequence for example, in which the appearance-frequency of any possible number is equal to $1/n$. Therefore, neglecting the order for the appearance, all of the numbers in the uniformly distributed random sequence are actually predictable, since the curve of $b_i$ vs. $i$ in this sequence is linear as illustrated in FIG. 1. Namely, any point $(b_i \in R, i)$ is on the straight line through the points $(b_1, 1)$ and $(b_n, n)$. No matter how a number $b_i$ appears in the sequence R, it must be on the line shown in FIG. 1. In this regard, this number is therefore predictable.

Figure 2:
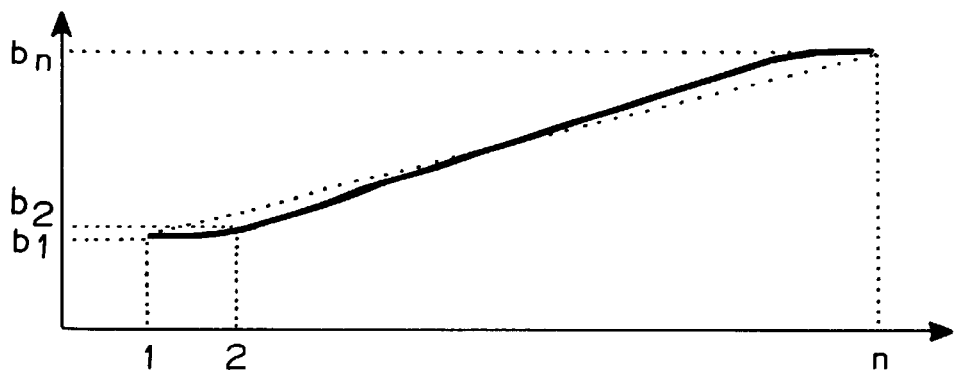
FIG. 2 is a graph of a monotonic smooth curve which represents a predictable sequence of symbols.

Another possible curve of R is illustrated in FIG. 2, which is monotone increasing and smooth. If enough points of such a curve can be obtained, then the rest of the points on the curve are predictable. Note that, the curve shown in FIG. 2 is taken from a white noise sequence.

Figure 3A:
FIGS. 3A and 3B are graphs of non-smooth curves which are employed to illustrate the Nyquist sampling theory.

Now, consider if a number on a monotone increasing, but non-smooth, curve as illustrated in FIG. 3A is predictable. Here, non-smooth means that the curve is multiple convex-concave. To simplify the discussion, first consider a deterministic curve $(b_i, w_i)$ generated by, $$b_i = \alpha \sin(_\omega w_i) \tag{1}$$

where the period $_\omega$ and the coefficient $a$ are chosen in such a way that $\alpha_{107} < \pi/4$; and $w_i$ is the $i^{th}$ variable to generate $b_i$. Considering the numbers obtained as the sampling points from the sequence $R=[b_i]$, according to the Nyquist theorem, if the sampling points in the above sinusoidal curve are taken less than 2 per cycle, the phenomenon of aliasing will occur and the function of $\alpha \sin(_{107} w_i)$ will not be recovered. Note that the Nyquist theorem assumes all the sampling intervals $_\Delta$ are equal. That is, $w_i \equiv w_{i-1}(\mod _\Delta)$. To simplify the discussion, this assumption is kept, although in practice it is not necessary to have equal sampling intervals.

Figure 3B:
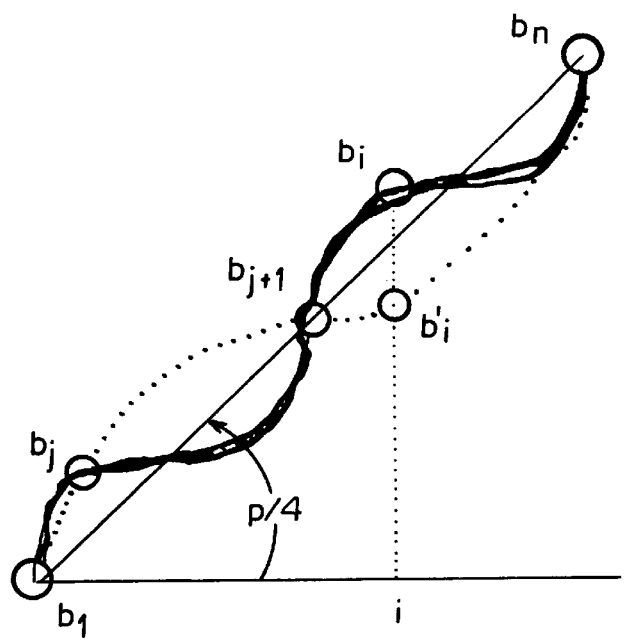

Turning the simplified monotone increasing non-smooth curve counterclockwise with angle $\pi/4$, as shown in FIG. 3B and described in equation (1), is a full rank linear transformation. Therefore, the Nyquist theorem can still be applied to the resulting new curve represented by the solid line in FIG. 3B. Thus, if only two samples $b_j$ and $b_{j+1}$ are taken from the curve in the range $b_1$ and $b_n$, then the function for the curve cannot be recovered. Instead, the "recovered" curve will be the aliased curve represented by the dotted line in FIG. 3B. This example to shows that, if the number of samples are less than a certain value in a given domain, the original sequence can never be recovered. In addition, a point, for example, $b_i$ in FIG. 3B, cannot be predicted. Instead, only fake points, such as $b_i'$, may be incorrectly guessed.

Now, consider a more complicated case described in the following equation and illustrated in FIG. 4:

$$b_i = \Sigma \alpha_j(w_i) \sin(_{107\ j} w_i + \theta_j(w_j)), j=1, \ldots, p \qquad (2)$$

where $\alpha_j$ and $\theta_j$ are both functions of $w_i$, and $_{\omega j} <_{\omega l}$ for $j<l$; p is an integer. It can be shown that there exist p pairs of $\alpha_j$ (i) and $_{\omega j}$ such that when the curve described by equation (2) is turned counterclockwise with the angle $_\omega/4$, the resultant curve is monotone increasing.

Certain points (not all points) from the curve are selected in such a way that in any given interval (j, j+1), there are less than two points so that, in accordance with the Nyquist theorem, the corresponding components of $_{\omega l}$ cannot be recovered. That is, the $1^{th}$ frequency component cannot be recovered. Therefore, the total sequence becomes unpredictable. From the above discussion, it can be concluded that a random sequence is not necessarily unpredictable, and that an unpredictable sequence is not necessarily random.

Figure 4:
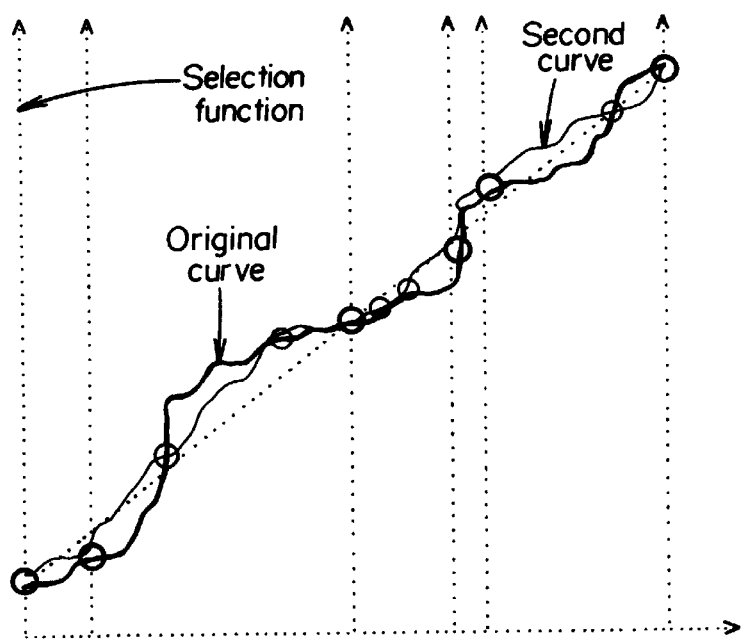
FIG. 4 is a graph illustrating a non-smooth curve, and a selection function employed to select an unpredictable sequence of points along the curve in accordance with the present invention.

As illustrated in FIG. 4, a selection function, shown as a set of arrows, is employed to select a plurality of cross points $b_i$ along the curve. The cross points of the original curve and the selection function are selected in such a way that in any interval (j, j+1), the curve is at least single convex-concave. The way for a selection function to pick up points is determined by certain keys. The function for generating those selected points, which defines the relationship between the output bi's and the keys of ($\alpha_j$, $\omega_j$, $\theta_j$), and the keys to generate the selection, can be referred to as a hash function. The amount of information within R is contained in all the pairs ($b_i$, $w_i$), which is considerably less than that in ($\alpha_j$, $\omega_j$, $\theta_j$)'s, and the selection keys. Particularly, when the selection follows the Nyquist theorem by selecting less than two points along the curve per cycle, the corresponding hash function is referred to as a Nyquist hash function.

Note that, after the selection, the number of order, denoted by $w_i$, is no longer continuous. Therefore, the set of $w_i$'s becomes another monotone increasing sequence. Since the $b_i$'s are not predictable, the $w_i$'s are also not predictable. The relationship between $b_i$ and $w_i$ is a one-to-one mapping. Therefore, the set $[w_1, w_2, \ldots]$ can also be used as an unpredictable monotone increasing sequence.

The above method, although safe, is not very convenient to use to check if a point belongs to both the original curve and the selection function, unless all of the $b_i$'s are stored in a database once the sequence is selected. The use of a large database will slow the search and needs a lot of memory, especially when extremely large numbers of $b_i$'s are involved. An alternative way to generate the $b_i$'s to accelerate the searching to and largely reduce the size of database is as follows. A second curve of the same kind as equation (2), but with a different coefficient key ($A_j$, $\Omega_j$, $\Theta_j$) is used:

$$B_i = \Sigma A_k(w_i) \sin(\Omega_k w_i + \theta_k(wi)), \qquad (3)$$

k=1, . . . , where, q is an integer.

The cross points of the two curves are determined by:

$$b(r_j) = B(r_j) \qquad (4)$$

where, the subscripts j are changed to indicate that only with $w_i = r_j$, the two functions $\Sigma \alpha_j(w_i) \sin(_{\omega j} w_i + \theta_j(w_i))$ and $\Sigma A_k$ ($w_i$) $\sin(\Omega_k w_i + \Theta_k(w_i))$ are equal. By means of the aforementioned rationale, instead of using $b_i$ and/or $B_i$, the set of $r_j$'s can be used to form the desired sequence. That is:

$$R = [r_1, r_2, \ldots r_x] \qquad (5)$$

where x is an integer, which should be less than both p and q. Since neither curve is predictable, the cross points, r's, cannot be predicted, either.

Next, using the selection function denoted by S, another sequence U of a smaller size is obtained:

$$U(u) = S(u)R(u) = [u_1, u_2, \ldots u_y] \qquad (6)$$

where y is an integer less than x, and the number u means that only if r=u, a number $r_j$ in sequence R is selected; and for simplicity, the subscripts of r and u have been deleted. U is thus a subset of R, and since R described in equation (5) is unpredictable, so also is U. With the help of the selection function S, even if someone knows all of the r's in the sequence R, they will not know which of the r's, i.e., the u's, will be used.

Even if the selection function S is predictable, it will not degenerate the unpredictability of the sequence U. However, for practical applications, S is also chosen to be unpredictable. As a result, the following statements are true:

1) Even if some of the u's are known, the rest of the u's are unpredictable;
2) Even if all of the r's in R are known, which of the r's that will be selected by S are unpredictable; and
3) Even if all of the u's are known, the functions S, b and B are unrecoverable.

To prove the validity of the above statements, the existence of the unpredictable sequence R has been shown. Without yet discussing the existence of the selection functions, the concept of unpredictability for S is limited to the condition that an attacker (cryptanalyst) does not know the entire set of R and U simultaneously. He may either have the entire set (or partial set) of R or U, though.

Suppose m candidates are selected to form U from R with n numbers. We first generate a monotone increasing sequence $S(I) = [s_1, s_2, \ldots]$ with more than m convex/concave. Then according to certain rules, m numbers can be selected. The rules can be chosen so that the first m points ($r_i$, i) at which the value of f ($s_i$, $r_i$, $_{\lambda i}$) is the smallest consequently and so forth. Here f is a function and $_{80\ i}$'s are some irrational numbers, for example, $$|\sin(_{\lambda i}(r_i - s_i))| = \min. \qquad (7a)$$

Again, according to the Nyquist theorem, S is not recoverable even if all the r's in R are known. Here, the key is a large digit number consists of the $_{\lambda i}$'s. With the above selection function S, if an attacker (cryptanalyst) knows the entire set of U and some of the r's which are not included in U, he cannot recover the selection procedure, either.

In the above discussions, specific examples of selection functions and hash functions have been employed to illustrate these concepts. However, it should be understood that the present invention is not limited to use of these specific functions. Accordingly, the following generalizations can be made regarding the Nyquist hash functions:

1. The Nyquist theorem has been used several times to show the existence of R, S and U. However, use of the Nyquist hash function is not necessary. In addition, the special functions described in equations (2) and (7a) are not necessary either. A more general form for the rule of selection can be explained by $$\|f(\lambda_i, s_i, r_i)\| = \min_{(i)}, i=1, 2, \ldots, m \qquad (7b)$$

which means that the first m minimal value of a certain norm of function $f(\lambda_i, s_i, r_i)$ will be chosen.

2. In addition, equation (6) is not necessary, either. For example, a multiple g- layer selection may be employed, that is $$U_1 = S_1 R$$
$$U_2 = S_2 U_1$$
$$U_g = S_g U_{q-1}$$

or $$U_g = S_g S_{q-1} \ldots S_1 R \qquad (8)$$

3. S may be an encryption function such that the $u_i$'s in U are different from the $r_i$'s in R. There are several attack-resistant encryption available in public domain. This idea is particularly useful if a sequence of conventional serial numbers should be used for unpredictable sequence.

4. One of the functions, say, $b_i$, can be eliminated. In this case, only the sequence R from $B_i$ is employed to simplify use and generation of the sequence R. The selection function can also be eliminated if desired. In this case, all of the r's will be used without any selection.

5. A further extension of equation (4) can be $$b(r_i^{(1)}) = B(r_i^{(2)}), \qquad (9a)$$

$i=1, 2, \ldots n$

Here, $r_i^{(1)} R^{(1)}$, $r_i^2 R^{(2)}$, $R^{(1)}$ and $R^{(2)}$ are generally different sets of sequences. In practice, the pair $(r_i^{(1)}, r_i^{(2)})$ is used simultaneously. Equation (4) is a special case of equation (9a). A degenerated method described above is another special case, namely:

$$B_i = B(r_i^{(1)}), \qquad (10)$$

$i=1, 2, \ldots n$

In equation (10), the number of $B_i$'s can be smaller than n. For example, $B_i$=constant=0.

For convenience, $b(r_i^{(1)})$ is named to be an evaluation function, re-denoted by E and B ($r_i^{(2)}$) to be a check function, re-denoted by C. Thus:

$$E(r_i^{(1)}) = C(r_i^{(2)}) \qquad (9b)$$

The reason to change the notation from (9a) to (9b) is not mathematical but rather practical, because in the sequence $R^{(2)} = [r_i^{(2)}]$ of the check function, the number $r_i^{(2)}$ can have a smaller number of digits than that of $r_i^{(1)}$ in the evaluation function. This feature is designed to accelerate the checking procedure on whether the pair of $(r_i^{(1)}, r_i^{(2)})$ is being used. For example, if it is used, $r_i^{(2)}$, instead of the entire pair $(r_i^{(1)}, r_i^{(2)})$, will be stored in a database, in order to minimize the size of the storage and reduce the searching time.

Also, when the issue of unpredictability is not critical, and the simplicity and/or cost are more important, the evaluation function E can be eliminated, as described in equation (10).

Since different sets of $R^{(1)}$ and $R^{(2)}$ are used, different selection equations can be used. That is $$U^{(1)}_g = S^{(1)}_g S^{(1)}_{q-1} \ldots R^{(1)}$$

and $$U^{(2)}_h = S^{(2)}_h S^{(2)}_{h-1} \ldots S^{(2)} R^{(2)} \qquad (11)$$

where g and h are integers.

The method of the present invention therefore uses certain functions to generate the sets of IDs, called evaluation functions and check functions. To explain them further and to understand the importance of the Nyquist function, consider a number or ways that a potential attacker or counterfeiter will attempt to determine the identity of a vendor's sub-subset of IDs.

First, attackers may collect portions of the symbol or ID sets. For example, a salesman may copy IDs from his inventory. Theoretically, these attackers intend to use a portion of the symbol set to predict the rest of the symbols in the set. In practice, with the present inventions algorithms, checking if an individual number or symbol r is valid is equivalent to checking if the following equation is true:

$$E_0(N^{(1)}) - C_i(N^{(2)}) \qquad (12)$$

Equation (12) is a further description of equation (9b). Here, $N^{(1)}$ and $N^{(2)}$ are two sets of specific symbols, which can be real or complex scalars, vectors, letters, numbers and their combinations, and $r_i^{(1)} \in N^{(1)}$, $r_i^{(2)} \in N^{(2)}$. To simplify the following examples, the superscript and/or subscript of the number r are neglected. Note that usually, the total number of $N^{(1)}$ is considerably smaller than that of $N^{(2)}$. In certain cases, $N^{(1)} = N^{(2)}$. In another cases, $N^{(1)}$ is null.

The subscript 0 and i denote the order $1^{th}$ and $i^{th}$ using the evaluation functions and checking functions. Generally, $C_i$ and $E_0$ are "secret" functions. To understand the function of $C_i$ and $E_o$, neglect the subscripts and superscripts and consider the following examples:

In the first example, let $C(r) = \sin(r)$, and $E(r) = 0$; that is, $\sin(r) = 0$. In the second example, let $C(r) = \sin(r)$, and $E(r) = 0, \frac{1}{2}, \sqrt{3}/2$; that is, $\sin(r) = 0, \frac{1}{2}, \sqrt{3}/2$.

Note that in the first example, any number $r = K\pi$ with arbitrary integer K will satisfy equation (12), and a number not equal to $K\pi$, must be invalid. Therefore, function $C(r) = \sin(r)$ is defined to be a check function. In the process of checking if a number r is valid, the value of the checking function is calculated or searched to determine whether it equals the value of the evaluation function. An attacker collecting the values $r = \pi, 2\pi, 3\pi$ and $99\pi$ may immediately realize that the check function is $\sin(r) = 0$ and determine the rest of numbers for $r = 4\pi, 5\pi, 6\pi, \ldots 100\pi$ and so on.

In the second example, N not only contains $3.4142(\pi)$, $6.2832(2\pi)$, $9.4248(3\pi)$, but also contains $0.5236(\pi/6)$, $4.1888(4/3\pi)$, and $10.472(10/3\pi)$. As a result, an attacker may be reluctant to guess that the next $r = 100\pi$. These examples therefore demonstrate that with only one known variable, equations with a signal periodic function can be easily figured out. However, equations become more difficult to determine when multiple-valued functions are employed.

In a third example, C is chosen to be an unpredictable number generator by means of the aforementioned Nyquist functions and E is a database which stores these numbers.

The sign "=" means that, if a number matches a number in the database, then it is valid. Obviously, this time, no one can guess the next correct number.

In practice, the above functions are too simple to be used for generating the desired numbers. However, the concept of equation (12) is still valid: E and C are chosen in such a way that, with only a portion of information, these functions cannot be uncovered. Such functions exist, they are in fact the Nyquist functions. For example, let $$C(r)=(r_1+a_1)(r_2+a_2)(r_3+a_3) \ldots (r_n+a_n) \text{ and } E(r)=0, \quad (13)$$

where, $a_{(\cdot)}$ are the unpredictable numbers. It is seen that, equation (13) is an alternative form of the above example. Suppose an attacker only knows three of the numbers $a_1$, $a_2$ and $a_3$. Again, if $a_{(\cdot)}$ is selected not to satisfy the Nyquist theorem, the attacker cannot figure out $a_4$, $a_5$ and $a_n$.

Next, in the circumstance where an attacker knows all of the numbers $r_1, r_2, r_3 \ldots r_n$, and these numbers can be used repeatedly, they will obviously be able to sell counterfeit goods without being identified. However, this will not be the case if the mark identification method only allows a specific number or ID to be used once, or a limited number of times. In this case, if an attacker does not know whether a specific number has been used or not, they will be reluctant to use them. This method is represented by function $E_0$, which means a number to be used for a specific vendor is "valid only once or a limited number of times". The function $E_0$ should therefore be able to identify how many times a number has been used.

The next examples highlight the advantage of employing symbol subsets between the agents and the vendors. Suppose that an attacker knows all the numbers and the function $E_0(r)$, and tries to figure out the check function $C(r)$. For example, assume that the attacker is one of the vendors who purchased all of the number sets from the service agent and knew those numbers had been issued for his goods (r being used). He then tries to figure out the function $C(r)$. If he really knows these numbers, it is highly possible for him to find $C(r)$. This may not include the case that the service agent gives these numbers by using several different functions $C_1, C_2, \ldots C_r$ to make the function C unpredictable. In practice, such a strategy will always be used. Here, suppose the attacker knows all of these numbers are generated through one functions $C_1$. By using a selection function, S, the agent will give only a portion of the total number of r's, instead of all of them to the attacker. In this way, the attacker will never be able to figure out the function C.

Another possibility is that the attacker is inside the service agent. That is, when a salesman inside the service agent sells a set of IDs to a first, legitimate vendor, he may also sell the same set of IDs to a second vendor who wants to counterfeit the first vendor's products. However, the first vendor uses his own confidential selection function to select only a portion of the IDs purchased from the service agent, and this precludes the second vendor from determining which of the IDs the first vendor is using. Any suitable function may be employed as the selection function, although it is preferable that it be unpredictable so that it cannot be determined by an attacker having knowledge of some IDs in the resulting sub-subset.

If an additional layer of sub-vendors, e.g., salesmen, are employed, more than two selection functions can be used with individual secret keys. For example, the agent may generate one billion numbers but only give the direct vendor one million sets by using his own selection function and secret keys. The direct vendor then uses his secret key and selection function to select a first set of ten thousand IDs, and provides them to his first salesman. He then uses another secret key to select a second set of ten thousands IDs, not necessary totally different from the first set of ten thousand IDs, and provides them to his second salesman. Under certain business considerations, such as services, shop locations, etc., the salesmen may want to protect their own respect and adapt the same marking method. Each of them then uses their own secret keys respectively to select, say, a set of one thousand IDs. In this arrangement, a total of four secret keys is therefore employed. Therefore, among the agent, the direct vendor, the first and the second salesman, no one can predict the IDs used by any of the other parties. To make the choice more flexible, a vendor can use his selection function more than once. That is, he may give one of his selection keys to the agent, but keep other keys secret.

The following are some simple examples which explain the way that the multiple-key method of the present invention works. Suppose an agent, A, provides original ID numbers; and a vendor, V, uses a subset of these numbers. A uses two keys, $K_{AG}$ and $K_{AS}$ to generate these numbers. First, a special $K_{AG}$ is used to select certain functions $F_G$ (n) with a predetermined period (or quasi-period) T. For example, let $$K_{AG}=456 \quad (14)$$

and $$F_{AG}(n)=4 \sin^5 (6n) \quad (15)$$

In this case, n can be a sequence of natural numbers; that is, $$n=1,2,3,4,5,6,7,8,9,10,12,13,14,15 \quad (16)$$

Next, a second key $K_{AS}$ is used to select a subset from n. For example, let $K_{AS}=789$ and another continuous function, e.g., $F_{AS}$ (n)=7 $\sin^8$ (9n), is used such that only those r's making:

$$F_G(n)=F_S(n), \quad (17)$$

will be selected. These n's are denoted by N, which is no longer a continuous sequence. For example, $$N=1,3,5,7,9,11,13,15,17,19 \quad (18)$$

Note again in practice, that the selection of N from n's must be done by making less than two samples in one cycle with period T in order not to satisfy the Nyquist sampling theory, and thereby guarantee no recovery of $F_{AG}$ (n).

Also note that, N described in (18) is only an example, which is not the exact the solution of (17). However, in practice, N must be the sequence of solutions to equation (17).

Now, this discrete sequence N is delivered to V by A. Then, V will use his own key, the third key, $K_{VS}$, to select another subset from N, in order to obtain his own sequence.

For example, using $K_{VS}=123$ with another selection function, $F_{VG}=\sin(N)$, V will be able to have his own subset of ID numbers $M \in N$ by letting:

$$F_{AG}(N)=1\sin^2(3N) \qquad (19)$$

As an example, $$M=1,5,9, \qquad (20)$$

Again, M described in (20) is only an example, which is not the solution of (19). However, in practice, M must be the sequence of solution.

Thus, from the above simplified examples, it is shown that, keys $K_{AG}$, $K_{AS}$ and $K_{VS}$ have different functions. A cannot use V's key $K_{VS}$ to generate the original sequence N. V cannot use A's key pair $K_{AG}$ and $K_{AS}$ to select his subset M. That is, key pair ($K_{AG}$, $K_{AS}$) and key $K_{VS}$ do not commute because they belong to different procedures of number generation and selection.

It is clear that, without knowing the key pair ($K_{AG}$, $K_{AS}$), V will never recover the function A uses to generate the original sequence N, which is guaranteed by the Nyquist theorem. At the same time, without knowing the key $K_{VS}$, A cannot determine the subset M that V will select from N, either; which is also guaranteed by the Nyquist theorem. Thus, the multiple-key method establishes a three-way attack-resistant method. A customer side attacker, who purchase goods from V (or from other sources) and obtains certain ID numbers cannot recover the subset M nor the original set N; he thus cannot counterfeit a fake number set to cheat vendors, other customers and the number providing agents. A vendor side attacker who purchases the original sequence N cannot recover the method of number generation. He thus cannot counterfeit a false number to cheat other vendors, customers and number providing agents. Finally, an agent side attacker who provides the set N to a vendor does not know the subset M selected by the vendor, and thus cannot provide the exact set M to another vendor to cheat this vendor and its customers.

Figure 5:
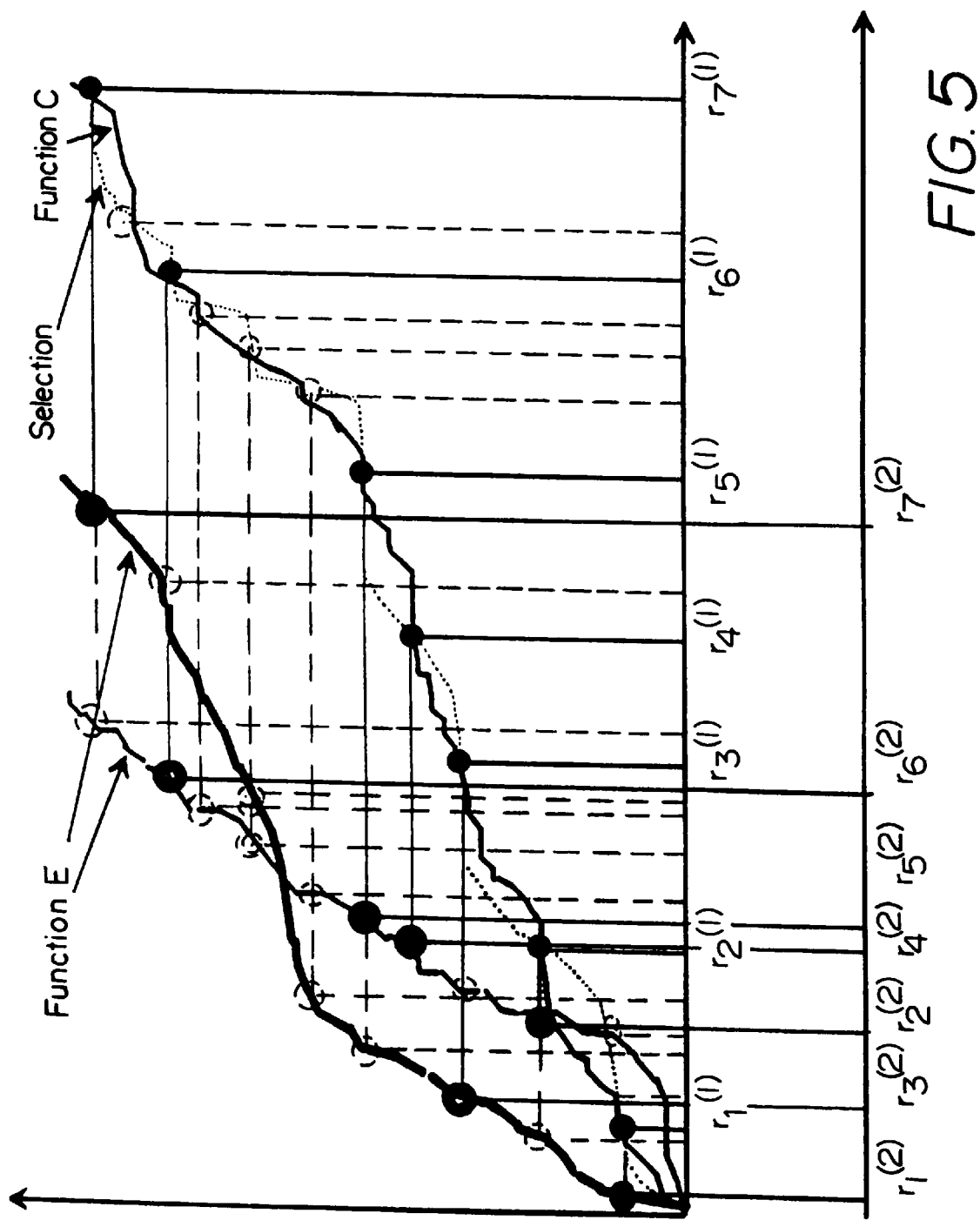
FIG. 5 is a graph illustrating nonlinear check and evaluation functions, and a selection function employed to select an unpredictable sequence of points along the curves represented by these functions in accordance with the present invention.

As another example, two sets of sequences may be generated using the multiple keys $\{K_{AGC}, K_{AS}, K_{AGE}\}$, $\{K_{VS1}\}$ and $\{K_{VS2}\}$ . . . , as follows with reference to FIG. 5 and the computer listing appendix at the end of the specification:

a) First, a nonlinear selection function S is used to pick up points along a curve defined by a nonlinear check function C. These points are denoted $r_1^{(1)}, r_2^{(1)}, r_3^{(1)}, r_4^{(1)}, r_5^{(1)}, r_6^{(1)},$ and $r_7^{(1)}$ as illustrated. In this action, a key $K_{AG}$ is used to determine the specific check function C, and another key $K_{AS}$ is used to select the first sequence ($r_1^{(1)}, r_2^{(1)}, r_3^{(1)}, r_4^{(1)}, r_5^{(1)}, r_6^{(1)}, r_7^{(1)}, \ldots$).

The function C can be treated as a "time series" and can be transformed into a "frequency domain" by using a Fourier transform. Suppose the highest frequency component of C has a period of T, then the above selection using $K_{AS}$ should be done in such a manner that the length of any interval $r_{i+1}^{(2)}-r_i^{(2)}$ is longer than T/2.

b) As an option, these points may be rearranged in a monotonic increasing manner to form a sequence $C^{(1)}$, which can be represented by monotonic increasing curve as shown in FIG. 3A. For a more secure procedure, another selection function can be employed to select points from the curve of $C^{(1)}$. The function $C^{(1)}$ can also be treated as a "time series" and can be transformed into a "frequency domain" by using a Fourier transform. Suppose the period of the highest frequency component of $C^{(1)}$ is τ, then the above selection with another key should be done in such a manner that the length of any interval of the selected two points is longer than τ/2. The newly selected sub-sequence can be denoted as $C^{(2)}$. However, these steps can be omitted, especially for the purpose of explaining the essence of multiple keys.

c) A third key is used to determine the evaluation function E. The essence of determining the evaluation function E is the same as the simple example shown in equation (15). Thus, to determine both the check and the evaluation functions, the agent should have at least two keys, $K_{AGC}$ and $K_{AGE}$, respectively, and a total of three keys is needed to generate both sequence $C^{(2)}$ and sequence $E^{(2)}$.

d) The sequence $E^{(2)}$ is not necessarily monotonic increasing. $E^{(2)}$ is generated by using the quantities $r_1^{(1)}, r_2^{(1)}, r_3^{(1)}, r_4^{(1)}, r_5^{(1)}, r_6^{(1)}, r_7^{(1)}$ . . . as range variables of E by the following steps:

First, by letting the value of E equal $r_1^{(1)}$, the corresponding value of $E^{-1}(r_i^{(1)})$ is found. Since the inverse function $E^{-1}$ is not necessarily single-valued, there may be more than one value corresponding to $r_1^{(1)}$.

Second, using certain selection methods, only one value $r_1^{(2)}$ is chosen from the above procedure. Note that, in this way, the pair $r_1^{(1)}$ and $r_1^{(2)}$ satisfies $$E(r_1^{(2)})=C(r_1^{(1)}) \qquad (21)$$

The above steps are then repeated to generate the pairs $r_2^{(1)}$ and $r_2^{(2)}$, $r_3^{(1)}$ and $r_3^{(2)}$, $r_4^{(1)}$ and $r_5^{(1)}$ and $r_5^{(2)}$, $r_6^{(1)}$ and $r_6^{(2)}$, and $r_7^{(1)}$ and $r_7^{(2)}$, etc.

The sequence $r_1^{(2)}, r_2^{(2)}, r_3^{(2)}, r_4^{(2)}, r_5^{(2)}, r_6^{(2)}, r_7^{(2)}$ . . . is not necessarily monotonic increasing. However, it is more convenient to arrange it so that it is monotonic increasing. The sequence $\{r_1^{(2)}, r_2^{(2)}, r_3^{(2)}, r_4^{(2)}, r_5^{(2)}, r_6^{(2)}, r_7^{(2)} \ldots \}$, denoted by $E^{(1)}$ can also be represented by a curve like the one shown in FIG. 3A.

The function $E^{(1)}$ can also be transformed into a "frequency domain" by using a Fourier transform. Suppose the period of the highest frequency component of $E^{(1)}$ is σ, then the above selection should be done in such a manner that the length of any interval $r_{i+1}^{(2)}-r_i^{(2)}$ is longer than σ/2. If certain points selected from $E^{(1)}$ do not satisfy this requirement, one of the points should be rejected to guarantee this requirement.

Note that, if a point $r_i^{(2)}$ is thus rejected from the sequence $E^{(1)}$, the corresponding point $r_i^{(i)}$ should be rejected as well to guarantee the one-to-one mapping described by equation (21). In this way, a new sequence $E^{(2)}$ is obtained, and the one-to-one mapping remains as follows:

$$E^{(2)}(r_i^{(2)})=C^{(2)}(r_i^{(1)}), \; i=1,2,3,$$

Note that, in most cases, the length of digits of $E^{(\cdot)}$ should be different from that of $C^{(\cdot)}$ as mentioned before.

Also note that, since the selection and rejection in form $E^{(2)}$ is not independent from the selection of $C^{(2)}$, in most cases, another key is not necessary. Therefore, the generation of the sequences $E^{(1)}$ and $C^{(1)}$, and the selection of $E^{(2)}$ and $C^{(2)}$ are actually done by using three keys, $\{K_{AGC}, K_{AS}, K_{AGE}\}$.

e) When the two sub-sequences $E^{(2)}$ and $C^{(2)}$ are provided to a vendor, he uses his own selection functions determined by his own secret key, $K_{VS1}$, to select his own secondary subsets $E^{(3)}$ and $C^{(3)}$. This is done by using the selection function on only one sub-sequence, either $E^{(2)}$ or $C^{(2)}$ as illustrated in FIG. 4.

After one subset, say, $C^{(3)}$, is selected, another one, say, $E^{(3)}$, is determined by using the equation $$E^{(3)}(r_i^{(2)})=C^{(3)}(r_{i(1)}),\ i=1,2,3,$$

f) The vendor can provide this pair of secondary subsets to his sub-vendors. In most cases, he provides his sub-vendors the sequences of symbols without overlap, to prevent different sub-vendors from marking their goods with the same pair of symbols.

g) The sub-vendors may repeat the selection by using the sub-vendor's own selection functions determined by his own secret key, $K_{VS2}$, to select his own third subsets $E^{(4)}$ and $C^{(4)}$ and so on.

h) These keys can be used directly to select certain secret functions, and/or databases, used for generation of sequences, and/or used for selection (re-selection) of sub-sequences. These keys can also be encoded for further attack-resistance. For example, a key 12345 can be encoded to be 6430, etc.

i) Although there are many ways to encode the key, it is preferable to use irrational number sets. For example, $(2)^{1/2}$=1.4142135623731 . . . . One can choose certain fractions from the irrational number, such as 14142, 14213, 13562 and 23731, etc. The rule of choosing which fraction is determined by the original key, which makes the recovery of the irrational number generation as well as the rule of fraction computational impossible.

Consider the following example:

It can be proved, by the Fermat's Last Theorem, that the value of F, $$F=(1+(A/B)^n)^{1/n}$$

is irrational, if A, B and n are positive integers and n>2. For convenience, F is referred to as the Fermat function hereafter.

The advantage of using the Fermat function-is that it can provide a large set of irrational numbers with light computational burden, in terms of computing speed and memory size.

Many functions f can be used to obtain other irrational numbers from F. For example, one can have $$F=\cos(XF)=\cos\left(X\left(1+\left(\frac{A}{A+B}\right)^n\right)^{1/n}\right)$$

where X is a secret key; for example, let the key be 12345. Then when A=3, B=1 and n=5,
f(12345, 3, 1, 5)=0.0078013476430 . . .

If A=4, and B and n remain unchanged,
f(12345, 4, 1, 5)=-0.6425835102170 . . .

If n=6, while A and B keep unchanged,
f(12345, 3, 1, 6)=0.6141451861615 . . .

Taking the last four digits as the alternative keys generates 6430, 2170 and 1615, respectively.

From the above examples, it is seen that, only a slight change in A or B or n, results in quite different alternative keys.

In addition, it is realized that, without knowing the key, say, 12345, it is impossible to obtain 6430, etc. even if one has the knowledge of F. More important, if one knows 6430, etc., he still cannot recover the specific F, nor the key 12345.

Therefore, using the encoded key and the Nyquist hash function, the vendor's (and/or the sub-vendor's) secret method of choosing sub-subsets cannot be recovered by the agent or anyone else, if they do not have the knowledge of the key.

Assume that attackers report certain symbols created by their own computers, either mischievously or in an attempt to figure out the rest of the symbols. In this way, the attackers may at least report some "correct" symbols and make them invalid. If an attacker uses computers to check out all of the "correct" pairs of symbols, he will make all the ID's invalid. In the following, we will show that this kind of attacking is computationally impossible.

In order to prevent such an attack, we separate the checking and the evaluating procedures. Suppose we have two symbols used in a pair. One of them is checked first and the checking procedure, including the log-in time on the Internet, takes 2 minutes. Then to find a "valid" number with short digits at the rate of 1 every 1200 tries, for example, will take 2400 minutes or 40 hours. Now, suppose an attacker has used his computer to find this first "correct" number in this way. He then needs to find the second "correct" one. Since this one has longer digits, say, one more digit, he will need another 200 hours if this time the checking time is one minute per symbol. The total of 240 hours or ten days on average for finding a "correct" pair will make this kind of attack very difficult in practice.

Note, as discussed previously, that each checking only allows one group of symbols to be entered and then logs-out the checking automatically. Meanwhile, it is easy to monitor the i- checking web-site to see if a user repeatedly logs-in to check an unusually large number of symbols. If this occurs, the agent can at least slow down the checking time or further measures can be taken on the web-site.

Since the chance of correctly guessing both the right numbers and certain auxiliary information, such as serial numbers, code or brand names, model numbers, date and/or place of manufacture, etc., can further protect this kind of attack, a reporter may be required to provide the additional information. This is referred to as conditional verification. In this case, the reporter is asked to enter the additional information together with the first ID symbol as the first checking procedure. Only if both the additional information and the first symbol are valid, is the first checking passed. Suppose the chance that a reporter has of correctly guessing the additional information is 1/10 and the chance that he finds out a "correct" symbol is 1/1200, then the total chance of passing the first checking is 1/12000. If 2 minutes are required for log-in and checking, he will need 400 hours or more than a half month on average to pass the first checking procedure.

Figure 6:
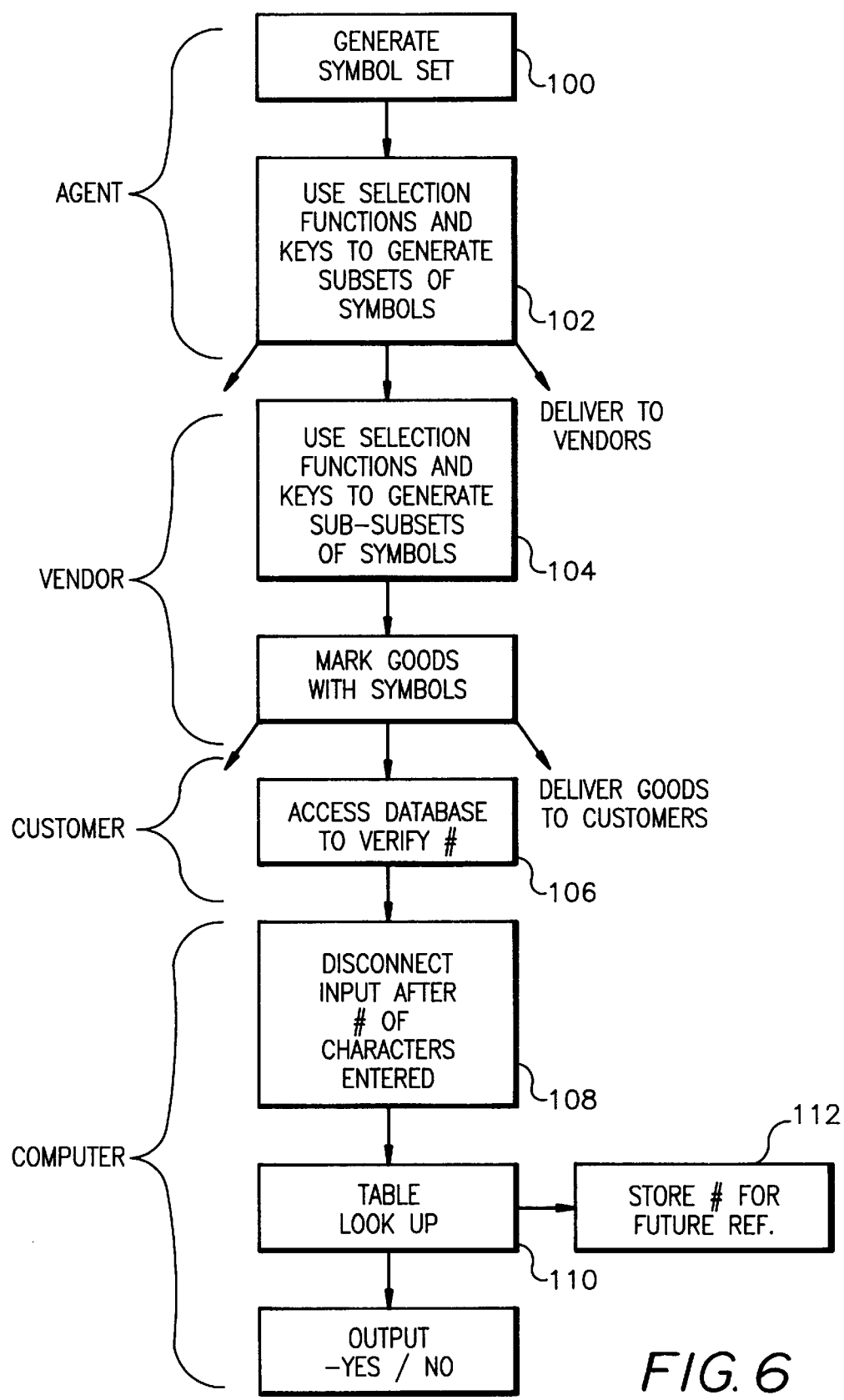
FIG. 6 is a flow chart illustrating the method of the present invention for generating unpredictable sequences of identification symbols.

In view of the foregoing, the method embodied by the present invention may be summarized by referring to FIG. 6, which is a flow chart of the method. First, at step 100, a provider or agent generates the sets of symbols to be delivered to the vendor or manufacturer of the goods to be authenticated. Each symbol comprises an identification number, mark, code, etc. which is typically formed of a plurality of numbers, letters, characters, marks and/or combinations thereof. The agent preferably generates one or more unpredictable sequences of these symbols, from which the subsets of IDs to be delivered to each vendor, are selected.

Typically, the initial set of symbols, from which all other subsets will be derived, will be very large, and will be selected using a Nyquist hash function so that the sequence is unpredictable. As discussed previously, however, it is not necessary for the original sequence to be unpredictable since the next steps of the process insure that knowledge of the original set of symbols will not be enough to enable a potential counterfeiter to determine the identity of the IDs employed by each vendor to authenticate their goods.

Next, at step 102, the agent employs Nyquist hash or selection functions and one or more selection keys to select each subset of IDs to be delivered to the vendors. As discussed previously, although it is sufficient to supply each vendor with one set of IDs, it is preferable that the agents supply two sets of IDs to each vendor, one of which contains symbols that are much shorter in length to facilitate quick checking of the IDs using a check function.

After the vendor or manufacturer receives the sets of IDs, they select sub-subsets of the IDs at step 104, again using Nyquist hash functions and selection keys, and these IDs are employed to mark the goods. Thus, the vendor employs a first key which uses a first Nyquist function to select a sub-subset of IDs from the first subset, and a second key which employs the second Nyquist hash function to select a sub-subset of IDs from the second subset. Each item to be marked is then marked with a first symbol from the first sub-subset, and a second symbol from the second sub-subset.

Next, at step 106, a customer who purchases one of the marked goods checks the authenticity of the goods preferably by accessing an agent or vendor database which contains information on all valid IDs. When the customer accesses the database, they are prompted to enter the shorter of the two IDs from the goods. The program managing the database knows the exact length of each of the shorter IDs, and at step 108, shuts off input from the customer once the proper number of digits have been entered. Next, at step 110, the computer determines whether the entered ID is valid by performing a table look up, and provides one of two answers, "yes" or "no", as output to the customer.

At the same time, at step 112, it is preferable that the computer keep track of the entered ID for future reference. In particular, it is preferable that each ID be used only once or a limited number of times, so that if different customers enter the same IDs more than the allowed number of times, this will provide an indication that at least some of the purchased goods are not authentic.

Although the present invention has been described in terms of a preferred embodiment and variations thereon, it will be understood that numerous additional modifications and variations could be made thereto without departing from the scope of the invention as set forth in the following claims. For example, although the invention is particularly useful for generating symbols for authenticating goods to be distributed by vendors, it will be understood that the invention may also be employed to authenticate any other types of objects as well. One such example is the receipt of sales. To insure that proper taxes are paid, a government agency can issue the unpredictable sequence to be marked on a vendor's receipts. Because any individual symbols of the sequence are unpredictable, a specific vendor may not be concerned with revealing his business to others. On the other hand, the government agency knows the particular sequence and therefore can monitor the sales of this vendor, as well as his taxes. The method can also be used to identify numerous other important documents and objects including the following: bank notes, checks, bills, bonds, passports, birth certificates, diplomas, credit cards, tickets, ID's, paintings, art products, valuable collections, prescriptions, coupons, licenses, contracts, deeds, notarized items.

The subject method for generating unpredictable sequences can also be used to encode text as well. For example, with an unpredictable sequence consisting of the letters w, x, y and z, the word GOOD can be encoded to be QSTF with the cipher codes:

Q=G mod(w), S=O mod(x), T=O mod(y) and F=D mod (z).

In order to increase the amount of information contained in any one symbol of the sequence, information concerning the relative angle or slant of the symbol can also be employed. For example, if four different possible angles are employed for each symbol, each symbol can now represent four different meanings. In this manner, the required space or digits for a given sequence can be further reduced. Special machines can also be employed to read the angled symbols, and translate them into computer codes for calculation.

Finally, the computer listing in the appendix provides example programs, written in MATLAB programming language, for generating the various functions, sequences and keys as indicated.

APPENDIX 1) original Check Function Generation

```
function x=cgenert1(key,m)
%generate original check function by using Irrational Set which
is
%guaranteed by Fermat Last Theorem
%the length of sequence x is m
I=10;
g=pi/17;
a=1;
n=digit(m);
for i=1:m,
x(i)=fract(abs((cos((1+((I+i)/(I+i+1)) ^3) ^(1/3) *key+g))),a,n);
end;
x=sort(x);
%end of program, Z.Liang & G. C. Lee
%Also see fract digit cdigit cgenerat egenerat fapir agent
```

2) Main Program for Agent to Generate Vendor Subsets

```
function R=agent (Key_1,Key_2,Key,n,tol)
% agent's output
% generate first sequence
[c,e]=fpair(Key_1,Key_2,n,tol);
R0=[c e];
m=length(c);
% selection by agent
R=seleca(R0,Key,m);
end;
%end of program,, Z. Liang G. C. Lee
```

3) Inverse Evaluation Function Generation

```
function f=egenerat(key,c);
% generation of the second sequence by using evaluation function
n=length(c);
% using agent's keys
[key,m]=k0(key);
x=k1(key,m);
q=k2(key,m);
% f is a multi-valued function
for i=1:n,
f(i,1)=abs(cos(c(i)+x)*q)*10;
f(i,2)=abs(q*sin(x*c(i)+1))*10;
end
%end of program Z. L. 10-22-97 Revised
% also see: cgenerate select select1 seleca fpair cdigit digit
% effect exchange agent
% chefun evafun
```

4) Vendor Selection Function

```
function y=select(x,k,n)
%Selection functions according to crystal effect
%y=select(x,k,n);x:original set; k: random seed; n:fraction of
numbers of x;
y=0;k=k+i;
rand ('normal'),rand ('seed',k);
l=length(x)-2;x=[x 0 0 0 0 0 0 0];s=rand(x);n=1*n;
```

APPENDIX-continued

```
i=1;
for m=1:l,
  for j=1:l,
    for i=1:l-1,
      if i>=l-1, break, end
      a=abs(sin(x(i)*cos(k*j*m*4)*10+s(i)*10*k))
        b=cos(j+m+i)*sin(x(i)*100);
          c=cos(tan(x(i)*100*s(i))+k*10+j*2);d=-0.7/(i+m);
          if sin(a*k)>cos(100*k),
            if (a<b),
              y=[y x(i)];
                l=l-1;
                x1=x(1:i-1)
                x2=x(i+1:l-1);
                x=[x1 x2];
                if length(y) >=n,break,end;
              end;
            if length(y) >=n,break,end;
            elseif sin(tan(b+k))>cos(log(k))/j,
              if (c<d),
                y=[y x(i)];
                  l=l-1;
                  x1=x(1:i-1);
                  x2=x(i+1:l-1);
                  x=[x1 x2];
                  if length(y) >=n,break,end;
                end;
              end;
            if length (y) >=n, break, end;
          end;
        if length(y)>=n,break,end;
      end;
    if length(y)>=n,break,end;
end;
y=sort(y(2:length(y)));
```
5) Subroutine for Agent Check Function Selection

```
function y=select1(Key,x,n)
%Selection functions according to crystal effect
%y=select(x,k,n);x:original set; k: random seed; n:fraction of
numbers of x;
k=k1(Key,1);
y=0;k=k+1;
rand('seed',k);
l=length(x)-2;x=[x 0 0 0 0 0 0 0];s=randn(length(x));n=1*n;
i=1;
for m=1:l,
  for j=1:l,
    for i=1:l-1,
      if i>=l-1, break, end
      a=abs(sin(x(i)*cos(k*j*m*4)*10+s(i)*10*k))
        b=cos(j+m+i)*sin(x(i)*100);
          c=cos(tan(x(i)*100*s(i))+k*10+j*2);d=-0.7/(i+m);
          if sin(a*k)>cos(100*k),
            if (a<b),
              y=[y x(i)];
                l=l-1;
                x1=x(1:i-1)
                x2=x(i+1:l-1);
                x=[x1 x2];
                if length(y) >=n,break,end;
              end;
            if length(y) >=n,break,end;
            elseif sin(tan(b+k))>cos(log(k))/j,
              if (c<d),
                y=[y x(i)];
                  l=l-1;
                  x1=x(1:i-1);
                  x2=x(i+1:l-1);
                  x=[x1 x2];
                  if length(y) >=n,break,end;
                end;
              end;
            if length (y) >=n, break, end;
          end;
```

APPENDIX-continued

```
        if length(y)>=n,break,end;
      end;
    if length(y)>=n,break,end;
end;
y=sort(y(2:length(y)));
```
6) Subroutine for Agent Check and Evaluation Functions

```
function y=seleca(x,k,n)
%Selection functions according to crystal effect
%y=select(x,k,n);x:original set; k: random seed; n:fraction of
numbers of x;
y=[0 0];k=k+1;
rand('seed',k);
l=length(x(:,1))-2;
x=[x' [0 0 0 0 0 0 0;0 0 0 0 0 0 0]]';
s=randn(length(x(:,1)));n=1*n;
i=1;
for m=1:l,
  for j=1:l,
    for i=1:l-1,
      if i>=l-1, break, end
      a=abs(sin(x(i)*cos(k*j*m*4)*10+s(i)*10*k))
        b=cos(j+m+i)*sin(x(i)*100);
          c=cos(tan(x(i)*100*s(i))+k*10+j*2);d=-0.7/(i+m);
          if sin(a*k)>cos(100*k),
            if (a<b),
              y=[y;x(i,:)];
                l=l-1;
                x1=x(1:i-1,:)
                x2=x(i+1:l-1,:);
                x=[x1;x2];
                if length(y) >=n,break,end;
              end;
            if length(y) >=n,break,end;
            elseif sin(tan(b+k))>cos(log(k))/j,
              if (c<d),
                y=[y x(i)];
                  l=l-1;
                  x1=x(1:i-1);
                  Φx2=x(i+1:l-1);
                  x=[x1 x2];
                  if length(y) >=n,break,end;
                end;
              end;
            if length (y) >=n, break, end;
          end;
        if length(y)>=n,break,end;
      end;
    if length(y)>=n,break,end;
end;
y=sort(y(2:length(y)));
```
7) Optional Encoded Key Generator

```
function kirr=keyirr(key)
% Using Irrational Set guaranteed by Fermat Last Theorem to
generate
% the second set of keys
% taking from Fermat Irrational Numbers with secrete rules
%Alter the original key
kir=sqrt(7); %kir is a secrete irrational such as pi, sqrt(3),
...
key=key+kir;
m=digit(key); % in this example, m is length(key)-1, if key is
an integer
a=1; % where integers a & b are the "secrete rule", a,b can be
1, 2, 3, . . .
b=2; % in this example, a < m, b < m
n=3; % where n is another "secrete rule" n can be 1, 2, 3, . . .
n=n+3; % n don't have to be large numbers, many computers can't
afford large n
p=1e10;% p, q are another secrete rules
q=6;   % Note that even these rules are known, keyirr will be
unknown unless
  *% key is known; If key is known by these rules are
unknown, kirr
  % is unknown; By using fract.m kirr can be
multi-layer-secrete
key=sin(key+n/a)*100000;
% partition of the key
```

APPENDIX-continued

```
key1=k1(key,m+a);
key2=k2(key,m+b);
kir=kir+((1+(key1/(key1+a)) ^n) ^(1/n)-1)*p;
%kir=cdigit(k0(kir),m+b);
%kir=kir-floor(kit),
kir=abs(cos(kir+b)*10 ^q);
kirr=kir;
% N=2; M=5;
% kirr=fract(kirr,N.M) % an alternative way to take a fraction
from kirr
%end of program Z. Liang Jan. 1995
%also see fract digit cdigit
```

8) Evaluation Function For Evaluating if a Pair of Symbols Reported by and Individual is Valid

```
function e=evafun(Key_1,Key_2,R,tol)
%evaluation function
E=egenerat(Key_2,R(1));
a=round(E(1)*50*log(k1(Key_1,2)))
b=round((E(1)+E(2))*100*log10(k1(Key_2,2)));
if abs(R(2)-a)<=tol,
    e=1;
elseif abs(R(2)-b) <=tol,
    e=1;
else
    e=0;
end;
%End of Program
```

9) Nyquist Hash Function

```
function x=nyqst(y,key);
% Using Nyquist Hash Function to select sub-set from y;
y0=y-mean(y);
Y0=abs(fft(y0));
m=length (y)/2;
Y0=Y0(1:m);
[M,I]=max(Y0);
for i=I+1:m,
    if Y0(m-i)>=M/3,
        I0=ceil (m/(m-i));
        break;
    end;
end;
rand('seed',key);
for i=1:2*m/I0,
    x(i)=Y(i*I0-I0+2+round(abs(randn(1))));
end;
%end of program z.l and g.c. l
%also see select seleca select1 egenerat egenert1 cgenerat
%fpair
```

10) Subroutine for Agent to Generate Subsets

```
function [c,e]=fpair(Key_1,Key_2,n,tol);
%agent's first set (in pair)
co=cgenerat(Key_1,n,tol);
%co=cgenert1(Key_1,n); % Alternative way to generate c-sequence by
% using irrational set guaranteed by Fermat Last Theorem
c=select1(Key_2,co,n);
% c=nyqhash(Key_2,co); % Alternative way to select the second c-sequence
% by using Nyquist hash function
e1=egenerat(Key_2,c);
n=length(e1);
Key1=k1(Key_1,2);
% Key1=keyirr(Key1) % Alter the key
Key2=k1(Key_2,2);
% Key2=keyirr(Key2) % Alter the key
for i=1:n,
    if e1(i,1)>=e1(i,2),
        e(i)=(e1(i,1))*log(Key1)*50;
    else
        e(i)=(e1(i,2)+e1(i,1))*log10(Key2)*100;
    end;
end;
c=c';
e=e';
%end of program Z. L and G. L revised 10-25-97
% Also see agent k0, k1, k2 select seleca select1 cgenerat
``` egenerat
% Also see keyirr nyqhash cgenert1

11) Check Function to Check if a Number is Valid

```
function a=chefun(Key,m,A,tol)
% Simplified procedure of generating C-sequence using inverse of
% a check function
% Key: key to generate
% A : Monotonic increasing sequence
% tol: Tolerance that controls the generation rate of a(j)/A(i);
% partition the key
x=k1(Key,m);
q=k2(Key,m);
% check function
if   abs(exp(cos(x/A+A). ^3)-abs(soc(q))*pi*exp(sin(x))) < tol,
    a=A;
    break;
else
    a=0;
end
%End of program Z. Liang & G. C. Lee, revised @ Sept. 12, 1997
```

12) Subroutine for Generating Irrational Key

```
function x=fract(y,n,m)
% take a fraction from the n-1 th digit of y with digit m
x=cdigit(y,n)-floor(cdigit(y,n));
x=x*10 ^m;
x=floor(x);
```

13) Subroutine to Shift Decimal Point

```
function n=cdigit(x,m),
% bring any number abcdefg.higk into the form of (a.bcdefghifk)
*10 ^m
if abs(x)>1,n=x*10 ^(-digit(x)+m);
else, n=x*10 ^(-digit(x)+m-1);
end
%end of program Z. LIANG
```

14) Subroutine to Check Number of Digits Before Decimal Point

```
function i=digit(a)
%check how many digit of a
if abs(a)>=1,
    for i=1:16,
        if abs(a)<10 ^i,break,
        end;
    end;
else
    for i=1:16,
        if abs(a)*10 ^i>(1-1e-16),i=-i;break,
        end;
    end;
end;
```

15) Alternative Check Function Generation

```
function c=cgenerat(Key,n,tol)
% generation of the first seguence by using the check function
% c=cgenerat(Key,n,tol)
[Key,m]=k0(Key);
j=0;
for i=1:n,
    if chefun(Key,m,i,tol)==i,
        j=j+1;
        c(j)=i;
    end;
end;
%end of program Z. Liang & G. C. Lee
%also see egenerat chefun evafun select select1 seleca k0 k1 k2
effect
% fpair exchange agent
```

16) Key Generation Functions
K0

```
function [Key,m]=k0(Key)
%extract the partition number from Key
% m=floor(cdigit(Key,1)); % an alternative method
n=digit(Key);
m=floor(n/2);
Key=k2(Key,1);
```

APPENDIX-continued

```
%end of program Z. L. & G. C. L
% also see k1 k2
K1 function x=k1 (key,m)
% Output the first m digit of the key
x=floor(cdigit(key,m));
% End of program, Z. L and G.C. Lee, March 1996
% also see k0 k1 cdigit digit
K2 function q=k2(key,m)
%last n-m digit of a key with n digit
n=digit(floor(key));
x=k1(key,m);
x=x*10^(n-m);
q=floor(key-x);
%end of program Z. Liang. and G. C. Lee 3-22-96
Copyright 1997, Zhong Liang, George Lee, All Rights Reserved
```

What is claimed is:

1. A method for providing authentication identification symbols on a plurality of objects comprising the steps of:
   a) providing a first sequence of symbols;
   b) selecting a first and second subsets of symbols from said first sequence, said first and second subsets of symbols being selected to be unpredictable so that knowledge of one or more of said symbols in said subsets cannot be employed to predict other symbols in said subset;
   c) providing said first and second subsets of symbols to an individual for use as authentication symbols on a plurality of objects;
   d) marking each of said objects with an identification symbol pair comprising a first symbol from said first subset, and a second symbol from said second subset;
   e) entering a symbol pair into a checking means to check whether it is valid, said checking means carrying out the steps of:
   f) checking the first symbol in said pair to determine whether it is valid, and if not, generating an indication that the symbol pair is invalid;
   g) if said first symbol in said pair is valid, checking said second symbol in said pair to determine whether it is valid, and if so, generating an indication that said symbol pair is valid, and if not, generating an indication that said symbol pair is invalid.

2. The method of claim 1, wherein said steps of checking further comprise entering said first and second symbols in said symbol pair into first and second functions, respectively, and determining that said symbols are valid only if a predetermined value is generated by each of said functions.

3. The method of claim 1, wherein said first symbol of said pair is selected to be shorter in length than said second symbol of said pair.

4. A method for providing authentication identification symbols on a plurality of objects comprising the steps of:
   a) providing a first sequence of symbols;
   b) selecting a first subset of symbols from said first sequence, said subset of symbols being selected to be unpredictable by using mathematical functions based on the Nyquist sampling theorem so that knowledge of one or more of said symbols in said subset cannot be employed to predict other symbols in said subset;
   c) providing said subset of symbols to an individual for use as authentication symbols on a plurality of objects; and
   d) marking each of said objects with a corresponding one of said symbols in said subset.

5. A method for providing authentication identification symbols on a plurality of objects comprising the steps of:
   a) providing a first sequence of symbols by:
      1) generating a nonlinear function in a multiple coordinate system having a plurality of axes, said function being represented try a first curve in said multiple coordinate system, and including a plurality of frequency components, the highest of which has a period of length T;
      2) selecting a first plurality of points along said first curve, with the minimum spacing interval between any two of said points being greater than T/2, each of said points being denoted by a coordinate value for each of said axes; and
      3) defining a group of said coordinate values for one of said axes to be said sequence of identification symbols;
   b) selecting a first subset of symbols from said first sequence, said sub set of symbols being selected to be unpredictable so that knowledge of one or more of said symbols in said subset cannot be employed to predict other symbols in said subset;
   c) providing said subset of symbols to an individual for use as authentication symbol on a plurality of objects; and
   d) marking each of said objects wit a corresponding one of said symbols in said subset.

6. The method of claim 5, further comprising the steps of:
   e) generating a second nonlinear function represented by a second curve in said multiple coordinate system, said function including a plurality of frequency components, the highest of which has a period of length T2;
   f) selecting a second plurality of points along said second curve, with the minimum spacing interval between any two of said points being greater than T2/2, each of said points being denoted by a coordinate value for each of said axes;
   g) defining a group of said coordinate values for one of said axes to be a second sequence of identification symbols; and
   h) selecting a second subset of symbols from said second sequence; and
   i) providing said second subset of symbols to said individual for use as authentication identification symbols.

7. The method of claim 6, wherein said steps of selecting said first and second pluralities of points further comprise applying a selection function to said first and second nonlinear functions, respectively.

8. The method of claim 5, wherein said step of selecting said plurality of points along said first curve further comprises applying a first selection function to said first nonlinear function.

9. The method of claim 8, wherein at least a first key is applied to said first selection function.

10. The method of claim 5, wherein a first key is employed to generate said nonlinear function, a second key is employed to select said first plurality of points, and a third key is employed to select said subset.

11. A method for providing authentication identification symbols on a plurality of objects comprising the steps of:
    a) providing a first sequence of symbols;
    b) selecting a first subset of symbols from said first sequence, said subset of symbols being selected to be unpredictable so that knowledge of one or more of said symbols in said subset cannot be employed to predict other symbols in said subset;

c) providing said subset of symbols to an individual for use as authentication symbols on a plurality of objects;

d) said individual selecting a sub-subset of symbols from said first subset, said sub-subset of symbols also being selected to be unpredictable;

e) marking each of said objects with a corresponding one of said symbols in said sub-subset;

whereby, an individual having knowledge of said first sequence cannot predict the identity of symbols in said subset and sub-subset, an individual having knowledge of said subset cannot predict the identity of symbols in said first sequence and said sub-subset, an individual having knowledge of said sub-subset cannot predict the identity of symbols in said first sequence and said subset; and, an individual having knowledge of some, but not all, symbols in said sub-subset, cannot predict the identity of other symbols in said sub-subset.

12. The method of claim 11, wherein said step of providing a first sequence further comprises:

1) generating a nonlinear function in a multiple coordinate system having a plurality of axes, said function being represented by a first curve in said multiple coordinate system, and including a plurality of frequency components, the highest of which has a period of length T;

2) selecting a first plurality of points along said first curve, with the minimum spacing interval between any two of said points being greater than T/2, each of said points being denoted by a coordinate value for each of said axes; and 3) defining a group of said coordinate values for one of said axes to be said sequence of identification symbols.

13. The method of claim 12, further comprising the steps of:

f) generating a second nonlinear function represented by a second curve in said multiple coordinate system, said function including a plurality of frequency components, the highest of which has a period of length T2;

g) selecting a second plurality of points along said second curve, with the minimum spacing interval between any two of said points being greater than T2/2, each of said points being denoted by a coordinate value for each of said axes;

h) defining a group of said coordinate values for one of said axes to be a second sequence of identification symbols; and i) selecting a second subset of symbols from said second sequence; and j) providing said second subset of symbols to said individual for use as authentication identification symbols.

14. The method of claim 13, wherein said individual further carries out the steps of:

k) selecting a second sub-subset of symbols from said second subset; and l) employing said first and second sub-subsets of symbols as authentication identification symbols by marking each of a plurality of objects distributed by said individual with a pair of said symbols, one from said first sub-subset, and a second from said second sub-subset.

15. The method of claim 12, wherein a first key is employed to generate said nonlinear function, a second key is employed to select said first plurality of points, a third key is employed to select said subset, and a fourth key is employed to select said sub-subset.

16. The method of claim 11, further comprising the steps of:

f) selecting a second sub-subset of symbols:

g) providing said second sub-subset of symbols to a second individual;

h) selecting a subset of said sub-subset of symbols; and i) marking objects held by said second individual with symbols from said subset of said sub-subset.

17. The method of claim 11, wherein the step of selecting a sub-subset of symbols further comprises applying a selection function with a secret key to said subset of symbols, said secret key being encoded using irrational numbers.

18. The method of claim 11, wherein the step of selecting a sub-subset of symbols further comprises selecting a first sub-subset of symbols using a first selection function, and a second sub-subset of symbols using a second selection function.

19. The method of claim 11, wherein the step of selecting a sub-subset of symbols further comprises selecting a first sub-subset of symbols by applying a selection function with a first secret key to said subset of symbols, and selecting a second sub-subset of symbols by applying said selection function with a second secret key to said subset of symbols.

20. A method for providing authentication identification symbols on a plurality of objects comprising the steps of:

a) providing a first sequence of symbols;

b) selecting a first subset of symbols from said first sequence, said subset of symbols being selected to be unpredictable so that knowledge of one or more of said symbols in said subset cannot be employed to predict other symbols in said subset;

c) providing said subset of symbols to an individual for use as authentication symbols on a plurality of objects;

d) marking each of said objects with a corresponding one of said symbols in said subset.

e) entering an identification symbol in a checking means to check whether it is valid;

f) preventing further data entry once an authentication identification symbol to be validated has been entered;

g) determining whether said identification symbol is valid; and h) generating an output indicating whether said identification symbol is valid.

21. A method for providing authentication identification symbols on a plurality of objects comprising the steps of:

a) providing a first sequence of symbols;

b) selecting a first subset of symbols from said first sequence, said subset of symbols being selected to be unpredictable so that knowledge of one or more of said symbols in said subset cannot be employed to predict other symbols in said subset;

c) providing said subset of symbols to an individual for use as authentication symbols on a plurality of objects;

d) marking each of said objects with a corresponding one of said symbols in said subset. e) entering an identification symbol in a checking means to check whether it is valid;

f) determining whether said identification symbol is valid by applying said identification symbol to a check function, and determining that said symbol is valid only if a predetermined value is generated by said check function; and g) generating an output indicating whether said identification symbol is valid.

22. A method for providing authentication identification symbols on a plurality of objects comprising the steps of:

a) providing a first sequence of symbols;

b) selecting a first subset of symbols from said first sequence, said subset of symbols being selected to be unpredictable so that knowledge of one or more of said symbols in said subset cannot be employed to predict other symbols in said subset;

c) providing said subset of symbols to an individual for use as authentication symbols on a plurality of objects;

d) marking each of said objects with a corresponding one of said symbols in said subset.

e) entering an identification symbol in a checking means to check whether it is valid;

f) determining whether said identification symbol is valid by comparing said identification symbol to a plurality of valid identification symbols in a database; and g) generating an output indicating whether said identification symbol is valid.

23. The method of claim 22, further comprising the steps of entering additional identification information, and generating an indication that said symbol is invalid if said additional identification information is determined to be invalid.

24. A method for providing authentication identification symbols on a plurality of objects comprising the steps of:

a) providing a first sequence of symbols;

b) selecting a first subset of symbols from said first sequence, said subset of symbols being selected to be unpredictable so that knowledge of one or more of said symbols in said subset cannot be employed to predict other symbols in said subset;

c) providing said subset of symbols to an individual for use as authentication symbols on a plurality of objects;

d) marking each of said objects with a corresponding one of said symbols in said subset;

e) entering an identification symbol in a checking means to check whether it is valid;

f) determining whether said identification symbol is valid;

g) if said identification symbol is determined to be valid, marking said symbol as invalid for any future inquiries; and h) generating an output indicating whether said identification symbol is valid.

25. A method for providing authentication identification symbols on a plurality of objects comprising the steps of:

a) providing a first sequence of symbols;

b) selecting a first subset of symbols from said first sequence, said subset of symbols being selected to be unpredictable so that knowledge of one or more of said symbols in said subset cannot be employed to predict other symbols in said subset, each of said symbols comprising a character and an associated angular position for said character;

c) providing said subset of symbols to an individual for use as authentication symbols on a plurality of objects; and d) marking each of said objects with a corresponding one of said symbols in said subset.

* * * * *